(12) United States Patent
Morton

(10) Patent No.: US 11,561,321 B2
(45) Date of Patent: Jan. 24, 2023

(54) HIGH-SPEED SECURITY INSPECTION SYSTEM

(71) Applicant: Rapiscan Systems, Inc., Torrance, CA (US)

(72) Inventor: Edward James Morton, Guildford (GB)

(73) Assignee: Rapiscan Systems, inc., Torrance, CA (US)

( * ) Notice: Subject to any disclaimer, the term of this patent is extended or adjusted under 35 U.S.C. 154(b) by 0 days.

(21) Appl. No.: 17/444,918

(22) Filed: Aug. 12, 2021

(65) Prior Publication Data

US 2021/0373192 A1 Dec. 2, 2021

Related U.S. Application Data

(63) Continuation of application No. 16/878,982, filed on May 20, 2020, now Pat. No. 11,119,245, which is a continuation of application No. 15/002,592, filed on Jan. 21, 2016, now Pat. No. 10,698,128, which is a continuation of application No. 13/751,018, filed on Jan. 25, 2013, now Pat. No. 9,274,065.

(60) Provisional application No. 61/596,648, filed on Feb. 8, 2012.

(51) Int. Cl.
  *G01V 5/00* (2006.01)
(52) U.S. Cl.
  CPC .......... *G01V 5/0066* (2013.01); *G01V 5/0041* (2013.01)
(58) Field of Classification Search
  CPC .......................... G01V 5/0066; G01V 5/0041
  See application file for complete search history.

(56) References Cited

U.S. PATENT DOCUMENTS

| | | | |
|---|---|---|---|
| 3,919,467 | A | 11/1975 | Peugeot |
| 4,831,260 | A | 5/1989 | Dibianca |
| 4,998,270 | A | 3/1991 | Scheid |
| 5,040,199 | A | 8/1991 | Stein |
| 5,099,134 | A | 3/1992 | Hase |
| 5,319,696 | A | 6/1994 | Abdel-Malek |

(Continued)

FOREIGN PATENT DOCUMENTS

| | | |
|---|---|---|
| CN | 1798970 | 7/2006 |
| CN | 101379415 A | 3/2009 |

(Continued)

OTHER PUBLICATIONS

International Search Report for PCT/GB2011/050182, dated Dec. 28, 2011.

(Continued)

*Primary Examiner* — Chih-Cheng Kao
(74) *Attorney, Agent, or Firm* — Novel IP

(57) ABSTRACT

The present specification discloses a high speed scanning system for scanning cargo carried by rail. The system uses of a two-dimensional X-ray sensor array with, in one embodiment, a cone-beam X-ray geometry. The pulse rate of X-ray source is modulated based on the speed of the moving cargo to allow a distance travelled by the cargo between X-ray pulses to be equal to the width of the detector, for a single energy source, and to half the width of the detector for a dual energy source. This ensures precise timing between the X-ray exposure and the speed of the passing object, and thus accurate scanning of cargo even at high speeds.

15 Claims, 6 Drawing Sheets

(56) References Cited

U.S. PATENT DOCUMENTS

| | | |
|---|---|---|
| 5,321,271 A | 6/1994 | Schonberg |
| 5,418,372 A | 5/1995 | Schonberg |
| 5,591,983 A | 1/1997 | Yao |
| 5,661,377 A | 8/1997 | Mishin |
| 5,838,759 A | 11/1998 | Armistead |
| 5,909,478 A | 6/1999 | Polichar |
| 5,949,811 A | 9/1999 | Baba |
| 5,974,111 A | 10/1999 | Krug |
| 6,438,201 B1 | 8/2002 | Mazess |
| 6,459,761 B1 | 10/2002 | Grodzins |
| 6,504,898 B1 | 1/2003 | Kotler |
| 6,507,025 B1 | 1/2003 | Verbinski |
| 6,507,027 B1 | 1/2003 | Shinichikojima |
| 6,713,773 B1 | 3/2004 | Lyons |
| 6,714,620 B2 | 3/2004 | Caflisch |
| 6,847,040 B2 | 1/2005 | Strommer |
| 6,937,692 B2 | 8/2005 | Johnson |
| 7,010,094 B2 | 3/2006 | Grodzins |
| 7,272,208 B2 | 9/2007 | Yatsenko |
| 7,369,642 B2 | 5/2008 | Eilbert |
| 7,372,944 B2 | 5/2008 | Bernhardt |
| 7,388,205 B1 | 6/2008 | Verbinski |
| 7,391,849 B2 | 6/2008 | Smith |
| 7,397,891 B2 | 7/2008 | Johnson |
| 7,538,325 B2 | 5/2009 | Mishin |
| 7,709,818 B2 | 5/2010 | Matsuda |
| 7,783,004 B2 | 8/2010 | Kotowski |
| 7,809,104 B2 | 10/2010 | Poland |
| 8,054,937 B2 | 11/2011 | Langeveld |
| 8,437,448 B2 | 5/2013 | Langeveld |
| 8,781,067 B2 | 7/2014 | Langeveld |
| 9,274,065 B2 | 3/2016 | Morton |
| 10,698,128 B2 | 6/2020 | Morton |
| 2003/0016790 A1 | 1/2003 | Grodzins |
| 2003/0035510 A1 | 2/2003 | Strommer |
| 2004/0017888 A1 | 1/2004 | Seppi |
| 2004/0251415 A1 | 12/2004 | Verbinski |
| 2005/0085188 A1 | 4/2005 | Ishii |
| 2005/0117683 A1 | 6/2005 | Mishin |
| 2005/0123101 A1 | 6/2005 | Akutsu |
| 2005/0169421 A1* | 8/2005 | Muenchau ............ G01N 23/04 378/57 |
| 2005/0276376 A1 | 12/2005 | Eilbert |
| 2006/0182221 A1 | 8/2006 | Bernhardt |
| 2006/0273259 A1 | 12/2006 | Li |
| 2006/0274916 A1 | 12/2006 | Chan |
| 2007/0092066 A1 | 4/2007 | Tkaczyk |
| 2007/0104320 A1 | 5/2007 | Arenson |
| 2007/0140423 A1 | 6/2007 | Poland |
| 2007/0147585 A1 | 6/2007 | Eilbert |
| 2007/0211851 A1 | 9/2007 | Ogawa |
| 2007/0269013 A1 | 11/2007 | Liu |
| 2007/0290133 A1 | 12/2007 | Reber |
| 2008/0056608 A1 | 3/2008 | Spahn |
| 2008/0211431 A1 | 9/2008 | Mishin |
| 2009/0116614 A1 | 5/2009 | Kotowski |
| 2009/0257555 A1 | 10/2009 | Chalmers |
| 2009/0285353 A1 | 11/2009 | Ellenbogen |
| 2009/0323894 A1 | 12/2009 | Hu |
| 2010/0034355 A1 | 2/2010 | Langeveld |
| 2011/0019797 A1 | 1/2011 | Morton |
| 2011/0022253 A1* | 1/2011 | Chen ..................... B61L 1/161 701/19 |
| 2011/0038453 A1 | 2/2011 | Morton |
| 2011/0116600 A1 | 5/2011 | Morton |
| 2011/0274242 A1 | 11/2011 | Linev |

FOREIGN PATENT DOCUMENTS

| | | |
|---|---|---|
| CN | 102016647 | 4/2011 |
| CN | 102099708 A | 6/2011 |
| EP | 0146992 A1 | 7/1985 |
| EP | 0417965 A2 | 3/1991 |
| EP | 1642529 A1 | 4/2006 |
| JP | 2000262512 | 9/2000 |
| JP | 2002014059 | 1/2002 |
| JP | 2003287507 A | 10/2003 |
| JP | 2005124975 | 5/2005 |
| JP | 2005149762 | 6/2005 |
| JP | 2005534009 A | 11/2005 |
| JP | 2006518463 | 8/2006 |
| JP | 2007093501 | 4/2007 |
| JP | 2009014724 | 1/2009 |
| WO | 0033060 A2 | 6/2000 |
| WO | 0159485 A1 | 8/2001 |
| WO | 2001059485 | 8/2001 |
| WO | 2001079798 A2 | 10/2001 |
| WO | 2006000020 A1 | 1/2006 |
| WO | 2006053279 A2 | 5/2006 |
| WO | 2009000020 A1 | 12/2008 |
| WO | 2009027667 A2 | 3/2009 |
| WO | 2009106803 A2 | 9/2009 |
| WO | 2009137698 | 11/2009 |
| WO | 2009143169 A1 | 11/2009 |
| WO | 2010019311 | 2/2010 |
| WO | 201109581 | 8/2011 |
| WO | 2011095942 A2 | 8/2011 |
| WO | 2013082005 | 6/2013 |
| WO | 2013119423 A1 | 8/2013 |

OTHER PUBLICATIONS

"Oral Program of SORMA West 2008", Jun. 5, 2008, pp. 1-95, XP055167963, Retrieved from the Internet: URL: http://www2.lbl.gov/conferences/SORMA/assets/doc/SORMAOralProgram30May.pdf.

Langeveld et al.: "Intensity-modulated Advanced X-ray Source (IMAXS) for Homeland Security Applications", IEEE Transactions on Nuclear Science, vol. 56, No. 3, Jun. 2009.

International Search Report for PCT/US09/47292, dated Apr. 23, 2012, Rapiscan Laboratories, Inc.

Willem Gerhardus Johannes Langeveld et al: 'Intensity-Modulated Advanced X-Ray Source (IMAXS) for Homeland Security Applications', IEEE Transactions on Nuclear Science, IEEE Service Center, New York, NY, US, vol. 56, No. 3, Jun. 1, 2009 (Jun. 1, 2009), pp. 1288-1291, XP011262712, ISSN: 0018-9499.

International Search Report for PCT/US13/23676, dated Jun. 28, 2013.

International Search Report for PCT/IB2011/050469, dated Jun. 9, 2011.

SORMA West 2008 "Intensity Modulated Advanced X-Ray Source (IMAXS) for Homeland Security Applications", p. 74, [online], last updated: May 22, 2008. URL:http://www2.Lbl.gov/conferences/SORMA/assets/doc/SORMAOralProgram30May.pdf.

* cited by examiner

HIGH-SPEED SECURITY INSPECTION SYSTEM

CROSS-REFERENCE

The present application is a continuation application of U.S. patent application Ser. No. 16/878,982, entitled "High-Speed Security Inspection System" and filed on May 20, 2020, which is a continuation application of U.S. patent application Ser. No. 15/002,592, of the same title, filed on Jan. 21, 2016, and issued as U.S. Pat. No. 10,698,128 on Jun. 30, 2020, which is a continuation application of U.S. patent application Ser. No. 13/751,018, of the same title, filed on Jan. 25, 2013, and issued as U.S. Pat. No. 9,274,065 on Mar. 1, 2016, which relies on U.S. Provisional Patent Application No. 61/596,648, entitled "High Speed Security Inspection System" and filed on Feb. 8, 2012, for priority, all of which are incorporated herein by reference in their entirety.

FIELD

The invention relates generally to security systems for screening threats and contraband contained on vehicles, and more specifically, for screening cargo carried on a high speed rail system, such as a rail cargo car.

BACKGROUND

The physical shipment of materials, including the shipment of mail, merchandise, raw materials, and other goods, is an integral part of any economy. Typically, the materials are shipped in a type of shipping containment or cargo box. Such containments or boxes include semi-trailers, large trucks, and rail cars as well as inter-modal containers that can be carried on container ships or cargo planes. However, such shipping or cargo containers can also be used for illegal transportation of contraband. Detection of these threats requires a safe and accurate inspection system, yet one that is also highly efficient so as to not impose an excessive delay or processing burden on very high volumes of goods.

In particular, there exists a requirement for automated scanning of cargo carried by train for the purpose of security inspection. This cargo is typically in containerized form, whereby the container has a standard size and shape. Trains carrying cargo containers typically travel at a high speed (in the range 20 km/h to 150 km/h); therefore, the security inspection process should be capable of being conducted at these high speeds without interfering with the flow of trade. Further, the system must not expose any worker who may be present on the cargo train to radiation, such as a driver or guard, while radiation exposure to an individual who may be hidden within the cargo should be reduced to a reasonably low level.

Known scanning processes for inspection of containerized cargo include X-ray scanning, chemical analysis of vapour emitting from the cargo, listening to sound from the cargo to detect living objects and eventually interventional manual search of the cargo by one or more security officials.

Most common in almost all regions of the world is the use of X-ray scanning for scanning containerized cargo. Here, a variety of systems have been developed including mobile scanners (which drive past the object under investigation during scanning), trailer-based scanners (where the vehicle under inspection drives through the inspection zone), gantry-based scanners (which drive along rails past the object under inspection during a scan) and portal mode scanners (where a vehicle drives through the scanner and either the entire vehicle or just the cargo is scanned).

Most X-ray scanning systems use either a linear accelerator or an X-ray tube to produce the necessary penetrating radiation within a tightly collimated fan-beam of X-rays. Linear accelerator systems use energies typically in the range 1 MV to 9 MV while X-ray tube based systems use energies in the range 100 kVp to 450 kVp. Alternate radiation sources include gamma-ray emitting materials such as Co-60 or Cs-137 or X-ray sources such as betatrons. Occasionally, neutron sources are used for scanning cargo, including isotopic sources such as Am—Be or Cf-252 or electronic source such as D-D or D-T pulsed neutron generators.

In each case, the scanning speed of the system is constrained by factors such as the pulse rate achievable from the Linear Accelerator or the allowable dose rate from the X-ray tube to provide sufficient penetration of the cargo while simultaneously providing safe scanning of occupied cargo.

Systems known to those of skill in the art operate at scanning speeds of less than 15 km/h to preserve an acceptable image quality. This speed is determined by the pulse rate from the fan-beam X-ray source and the relatively narrow width of the X-ray sensor array.

There is therefore a need for a scanning system which is not constrained in providing higher scanning speeds that are required for screening cargo on rail cars. Additionally, such a scanning system is required to maintain excellent image quality regardless of scanning speed.

SUMMARY

In one embodiment, the system described in the present specification advantageously uses a two-dimensional X-ray sensor array combined with a cone-beam X-ray geometry. The scanning system described in the present specification further allows for maximum threat detection with minimum false alarms, and thus increased throughput.

In one embodiment, the scanning system described in the present specification advantageously recognizes that the precise timing between X-ray exposure and the speed of the passing object is critical and dependent upon the width of the two-dimensional array of X-ray sensors.

In one embodiment, the present specification is an X-ray inspection system for scanning cargo travelling at a high speed, comprising: a high energy X-ray source for generating an X-ray beam to irradiate the cargo, at least one detector array to receive the X-ray beam signals transmitted through the scanned cargo, wherein said X-ray source and said detector are placed on the opposite sides of an inspection zone, and a control system for modulating said X-ray source, such that the pulse rate of the X-ray source is in direct proportion to the speed of the passing cargo.

In one embodiment, the present specification is directed towards an X-ray system for scanning cargo, the system comprising: an X-ray source for generating a cone-beam of X-rays to irradiate the cargo; at least one two-dimensional detector array to receive the X-ray beam signals transmitted through the scanned cargo, wherein said X-ray source and said detector are placed on opposite sides of the cargo; a motion system to transport the cargo through the X-ray system beam along a linear trajectory perpendicular to the plane of the X-ray beam; and a control system for modulating said X-ray source, such that the pulse rate of the X-ray source is in direct proportion to the speed of the passing cargo.

In one embodiment, the X-ray source of the system of present invention is a single energy source.

In one embodiment, the pulse rate is modulated such that the distance travelled by the cargo between X-ray pulses is equal to the width of the detector.

In another embodiment, the X-ray source is a dual energy source. In this case, the pulse rate is modulated such that the distance travelled by the cargo between X-ray pulses is equal to half the width of the detector.

In one embodiment, the motion system comprises a train.

In another embodiment, the motion system comprises a truck.

Optionally, the X-ray system is used to scan cargo carried by rail.

Optionally, the system of present specification further describes a collimator to reject scattered radiation from the detector array.

Optionally, the control system is located remote to said scanning system.

In another embodiment, the present specification is directed towards an X-ray system for scanning cargo carried by train travelling at a high speed, the system comprising: an X-ray source for generating an X-ray beam to irradiate the cargo; at least one detector array to receive the X-ray beam signals transmitted through the scanned cargo, wherein said X-ray source and said detector are placed on opposite sides of an inspection zone; and a control system for modulating said X-ray source, such that the pulse rate of the X-ray source is in direct proportion to the speed of the passing cargo.

In one embodiment, the X-ray source is a single energy source.

In one embodiment, the pulse rate is modulated such that the distance travelled by the cargo between X-ray pulses is equal to the width of the detector.

In another embodiment, the X-ray source is a dual energy source. In this case, the pulse rate is modulated such that the distance travelled by the cargo between X-ray pulses is equal to half the width of the detector.

In one embodiment, the cargo is illuminated by high-energy and low-energy X-rays alternately to achieve material characterization.

Optionally, the X-ray system further comprises a system for acquiring optical images of the cargo. Further optionally, a cargo container is scanned if a valid container code is recognised from its optical image.

Optionally, the control system further comprises a system to determine speed of the passing cargo.

Optionally, the control system is located remote to said scanning system.

The present specification is also directed toward an X-ray system for scanning moving cargo, the system comprising: an X-ray source for generating a cone-beam of X-rays to irradiate the moving cargo, wherein the moving cargo travels along a linear trajectory perpendicular to the plane of the cone-beam of X-rays; at least one two-dimensional detector array to receive the cone-beam of X-rays transmitted through the moving cargo, wherein said X-ray source and said at least one detector array are placed on opposite sides of the moving cargo; a sensor to measure a speed of the moving cargo; and a control system for receiving data indicative of said speed from the sensor and modulating at least one of a pulse rate and energy level of the cone-beam of X-rays based upon the speed of the moving cargo and a dimension of said detector array.

In one embodiment, the X-ray source is a single energy source. In one embodiment, the control system modulates the pulse rate such that a distance travelled by the moving cargo between X-ray pulses is substantially equal to a width of the detector array.

In another embodiment, the X-ray source is a dual energy source. In one embodiment, the control system modulates the pulse rate such that a distance travelled by the moving cargo between X-ray pulses is substantially equal to half a width of the detector.

In one embodiment, the moving cargo is propelled along said trajectory by a train.

In another embodiment, the moving cargo is propelled along said trajectory by a truck.

In one embodiment, the X-ray system further comprises a collimator positioned proximate to said detector array to reject scattered radiation from the detector array. In one embodiment, the collimator comprises a plurality of collimator sheets configured into a plurality of rows and columns to form a grid.

In one embodiment, the control system is located remote from said scanning system.

The present specification is also directed toward an X-ray inspection system for scanning moving cargo carried by train travelling at a high speed, the system comprising: an X-ray source for generating X-ray beam signals to irradiate the moving cargo; at least one detector array to receive the X-ray beam signals transmitted through the moving cargo, wherein said X-ray source and said detector are placed on opposite sides of said train to form an inspection zone; and a control system for modulating said X-ray source, such that the controller modulates at least one of the pulse rate and energy level of the X-ray source based upon a function of a speed of the moving cargo and a width of the detector array.

In one embodiment, the X-ray source is a single energy source. In one embodiment, the control system modulates the pulse rate such that a distance travelled by the moving cargo between X-ray pulses is equal to the width of the detector.

In another embodiment, the X-ray source is a dual energy source. In one embodiment, the control system modulates the pulse rate such that a distance travelled by the moving cargo between X-ray pulses is equal to half the width of the detector. In one embodiment, the control system causes the X-ray source to switch between a high-energy X-ray beam emission and a low-energy X-ray beam emission alternately to generate data indicative of characteristics of material within said moving cargo.

In one embodiment, the X-ray system further comprises a system for acquiring optical images of the moving cargo. In one embodiment, the control system receives optical data from said system for acquiring optical image and, based on the optical data, determines if said moving cargo should be scanned with said X-ray beam signals.

In one embodiment, the control system further comprises a sensor system to determine a speed of the moving cargo.

In one embodiment, the control system is located remote to said scanning system.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION

In one embodiment, the present specification discloses systems and methods for detecting contraband and threats in cargo carried by a train travelling on a railway, using a scanning system design that is able to provide higher scanning speeds, in the range 20 km/h to 150 km/h. The scanning system described in the present specification also produces excellent image quality in spite of the high scanning speed.

In one embodiment, the system described in the present specification advantageously uses a two-dimensional X-ray sensor array combined with a cone-beam X-ray geometry, instead of projecting a tightly collimated X-ray fan-beam onto a narrow column of sensors as has been available in prior art. The scanning system described in the present specification further allows for maximum threat detection with minimum false alarms, and thus increased throughput.

In one embodiment, the scanning system described in the present specification advantageously recognizes that the precise timing between X-ray exposure and the speed of the passing object is critical and dependent upon the width of the two-dimensional array of X-ray sensors.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
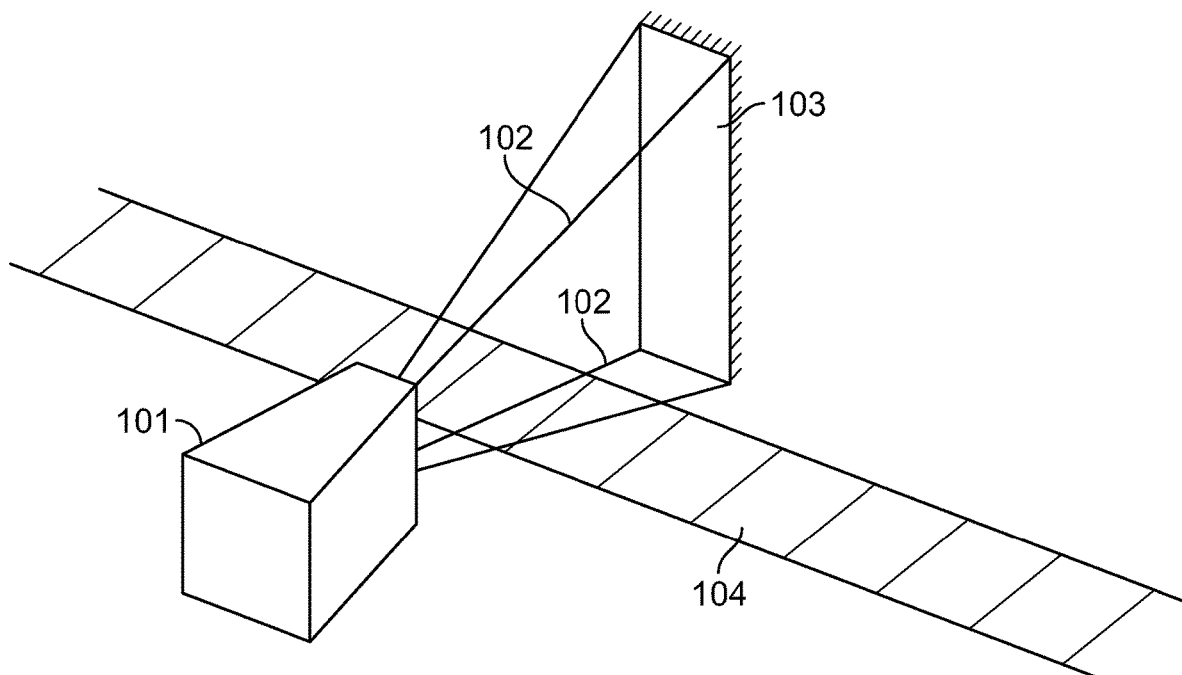
FIG. 1 provides an overview of the system geometry, according to one embodiment of the system described in the present specification.

An overview of the system geometry is provided in FIG. 1. Referring to FIG. 1, a linear accelerator X-ray source 101 is shown irradiating a cone-beam of X-rays 102 onto a two-dimensional X-ray detector array 103. The detector array 103 and the X-ray source 101 are located on the opposite sides of an inspection zone, which in one embodiment is the area around railway track 104 through which a train carrying cargo containers travels. Although the invention is described in the present specification in the context of automated scanning of cargo carried by rail, one skilled in the art would appreciate that the system of shown in FIG. 1 may be applied to scanning cargo in any vehicle, and implemented in any configuration such as mobile, trailer, gantry and portal configurations, as required by the application.

Figure 2:
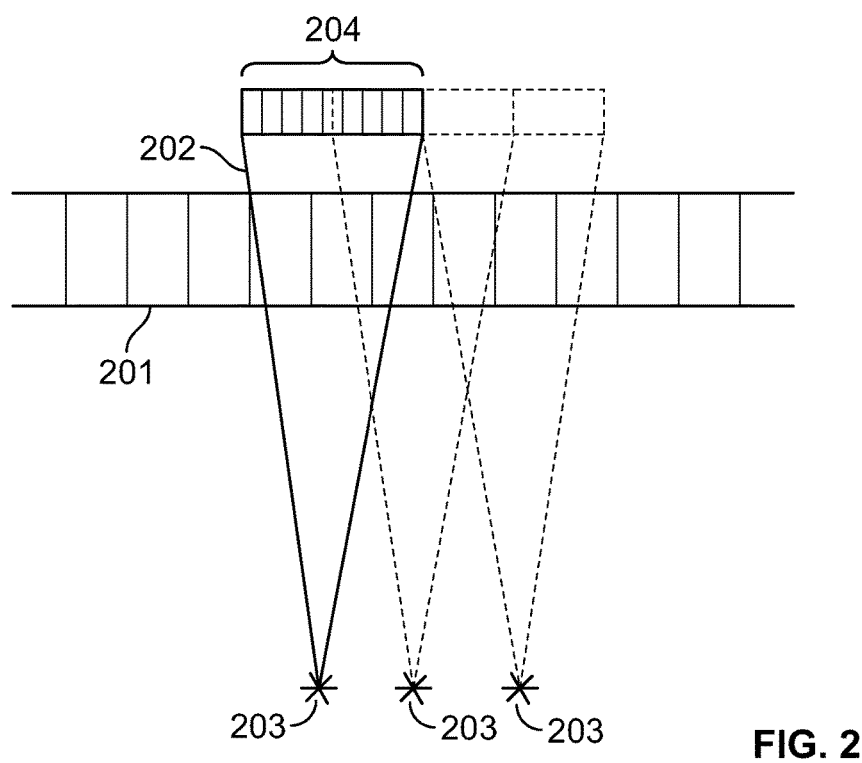
FIG. 2 illustrates a top view of an inspection zone, as shown in FIG. 1.

In one embodiment, the X-ray inspection system works with the cargo moving in a substantially linear path as it passes through the scanning zone. To allow accurate scanning of the rail cargo passing on the rail track between the X-ray source and the detector, the present invention ensures precise timing between the X-ray exposure and the speed of the passing object. This critical timing is, in turn, dependent on the width of the two-dimensional array of X-ray sensors. FIG. 2 shows a view of the inspection zone 202 from above, looking down to the plane of the track 201. As can be seen from the figure, it is necessary that the distance that the cargo travels between X-ray pulses 203 is substantially, and in one embodiment exactly matched by the width of the detector 204, for a single energy system. In case of a dual energy system, the distance should be equal to exactly half the width of the detector. The use of dual-energy imaging is recommended for the best in image quality since all regions of the object under inspection are fully analysed in this case, and thus, in one embodiment, the system of the present invention employs a dual energy X-ray source.

Therefore, the X-ray pulse is timed to pulse based upon the speed of the passing cargo and based upon the known detector size, such that the distance the cargo travels between pulses is substantially equal to the detector width, or some portion thereof. It should be appreciated that the controller systems used to operate the X-ray source and the processing system used to process detected data may be pre-programmed with the known width of the detector, half the known width of the detector, or some other dimension related to the detector.

Figure 2A:
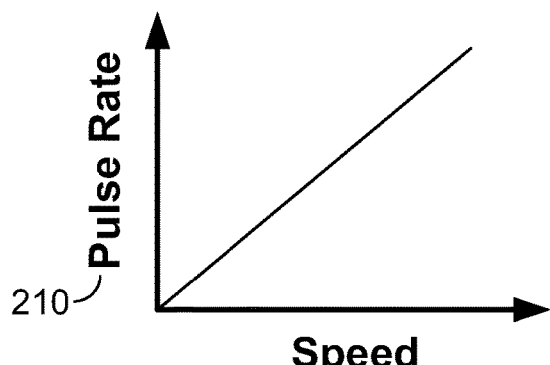
FIG. 2*a* is a plot graphing pulse rate versus speed of the cargo under inspection.

In a further aspect of the invention, the control system which drives the X-ray source modulates the pulse rate of the X-ray source in direct proportion to the speed of the passing cargo. This is shown in FIG. 2*a*, which plots pulse rate 210 versus speed of the cargo 211. The gradient of this graph is a simple function of the width of the detector array, that is, wider the detector array, smaller the gradient of the graph.

As an example, consider that a train is moving through the system at 100 km/h. This is equivalent to a speed of 27.8 m/s. For an X-ray source with maximum pulse rate of 300 Hz, the width of the detector array scaled to the center of the cargo should be 27.8 m/s divided by 300, which is equal to 0.093 m, in the case of single energy imaging or 0.185 m in the case of dual-energy imaging. The same simple calculation can be used to calculate pulse rate or detector width in any other situation. As an example, for a dual energy system with detector width of 0.185 m scaled to the centre of cargo, then at a scanning speed of 50 km/h, the linear accelerator (Linac) pulse rate should be 150 Hz.

In one embodiment, the spatial resolution of the system is specified in order to determine the number of detector elements which are required within the two-dimensional array of detectors, after determining the required width of the detector array. For example, if a 4 mm grid resolution is required in the generated image at 100 km/h with a maximum pulse rate of 300 Hz in a dual-energy imaging system, then the individual detector element width scaled to the center of cargo should be no more than 4 mm, so requiring at least (185/4)=47 detectors over the width of the detector array.

Figure 3A:
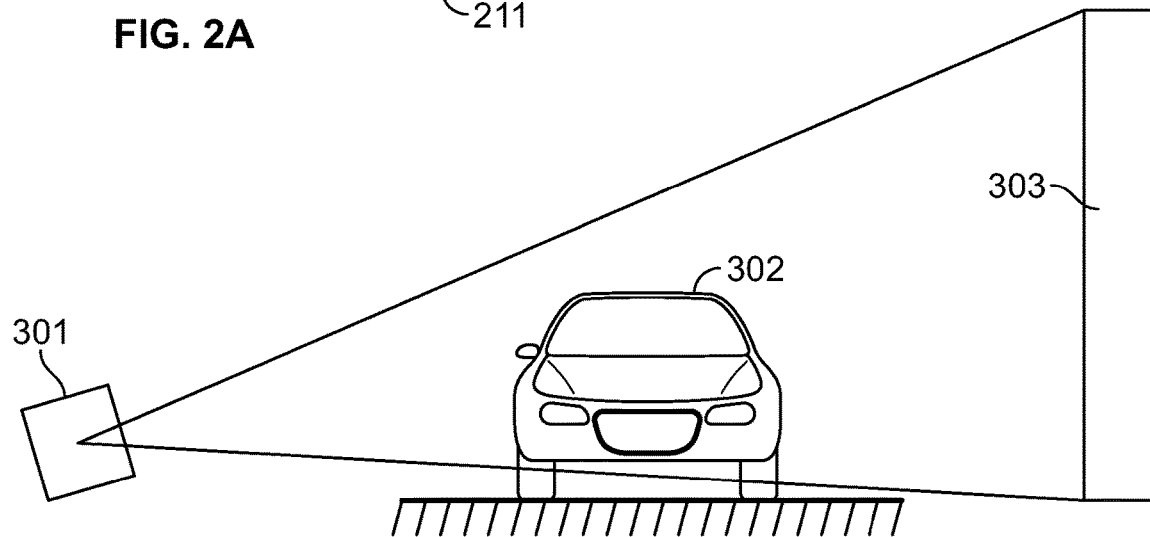
FIG. 3*a* illustrates an exemplary arrangement for a single track installation of the scanning system described in the present specification.

To minimize the cost of the X-ray detector array, it is reasonable to reduce the magnification of the system to ensure that the width of the X-ray detector array is as close as possible to its scaled width at the center of cargo. Therefore, as shown in FIG. 3a, in one embodiment the X-ray source 301 is ideally located far from the cargo 302, while the detector array 303 is placed close to the cargo. This is because the more the individual X-ray beams within the cone-beam 304 are parallel, the better is the final image quality on account of reduced parallax between adjacent projections in the X-ray image. However, the further the X-ray source is from the cargo, the more the reduction in signal intensity due to inverse square law. This leads to lower penetration performance of the X-ray image for given source intensity. Thus, there is a trade-off between image quality, penetration performance and ultimately radiation protection issues. This trade-off is typically analysed by one skilled in the art given the particular constraints of the required installation site and image performance requirements.

Figure 3B:
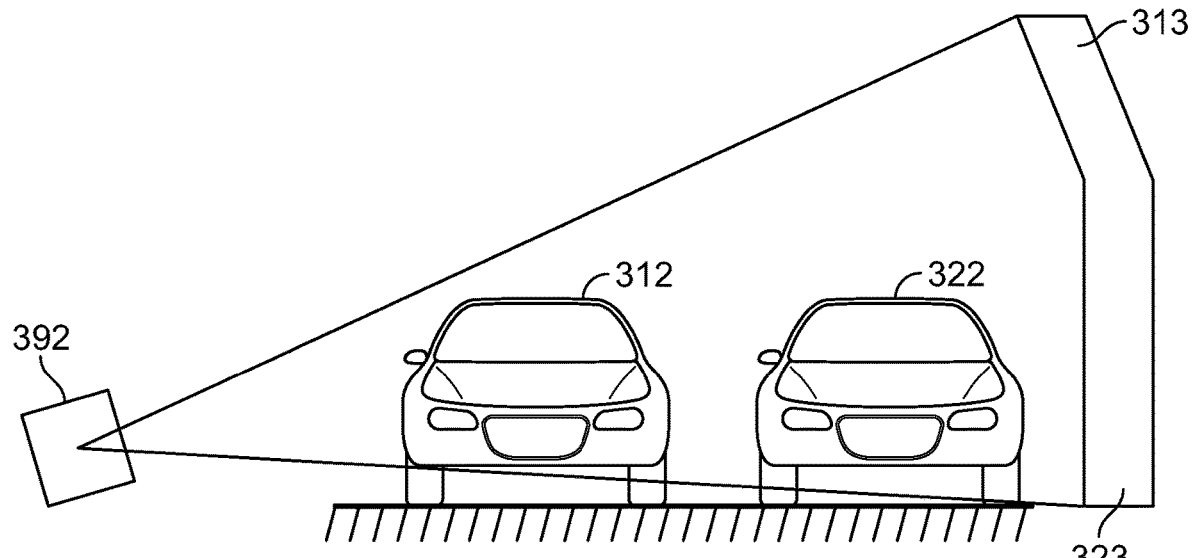
FIG. 3*b* illustrates an exemplary arrangement for a twin track system installation of the scanning system described in the present specification.

As shown in FIG. 3a, a single straight detector array 303 is employed in a single track rail installation used for scanning a single unit of cargo 302 at a time. FIG. 3b shows a twin-track system for simultaneous scanning of two adjacent units of cargo, 312 and 322. In this embodiment, the twin-track system is more advantageously serviced by two sections of detector array—a vertical section 323 in combination with an inclined array section 313. In an alternative embodiment, a single curved array section may be used instead of a combination of a vertical and an inclined array sections. Accordingly, the X-ray source 392 is directed toward, and aligned with, a first detector array 323, positioned vertically (or perpendicularly) relative to a ground surface, and a second detector array 313, positioned above the first detector array and at an acute angle relative to the ground surface in the direction of the X-ray source 392.

One of ordinary skill in the art will recognize that X-rays interact with matter through various mechanisms in the energy range of interest, which is 50 keV to 9 MeV. The most important mechanisms in this context are Compton scattering, photoelectric absorption and pair production. Both photoelectric absorption and pair production effects result in loss of an X-ray from the primary beam with re-emission of lower energy radiation (characteristic X-rays and 511 keV gamma-rays respectively). However, Compton scattering results in both energy and direction change of the incident X-ray. Thus, an X-ray which was previously travelling along one path can be diverted to move along a new path. This scattered X-ray can interact with the wide detector array which is the subject of this invention, resulting in a reduction in radiographic contrast. This has a negative impact on overall system performance.

Figure 4A:
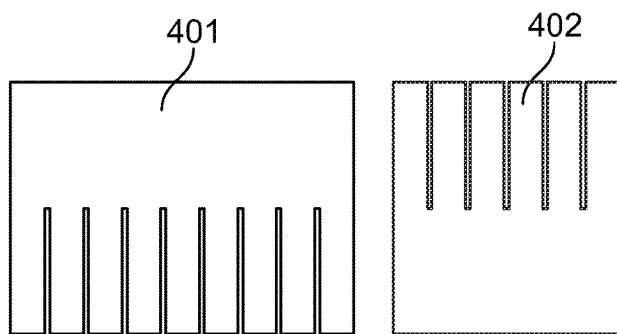
FIG. 4*a* illustrates an embodiment of a collimator assembly used to reject scattered radiation from the detector array.

To counter this negative impact, in a further aspect of the present invention, a collimator is provided which is used to reject scattered radiation from the detector array. This improves image contrast and ultimately also penetration performance of the system. FIG. 4a shows two sheets, 401 and 402, of a suitably attenuating material which are cut or otherwise machined into comb like structures. Suitable materials for such sheets include pure tungsten, alloys of tungsten, and alloys of lead or other high-Z materials which can be easily machined, such as Molybdenum or steel. The thickness of the attenuating sheets depends on factors such as the detector pitch, the spacing between individual detector elements within the detector array and the spectral distribution of X-ray energies produced by the X-ray source. In one embodiment, after considering all the aforementioned factors, the thickness of the attenuating sheets 401, 402 are chosen to be in the range 0.3 mm to 1.5 mm.

Figure 4B:
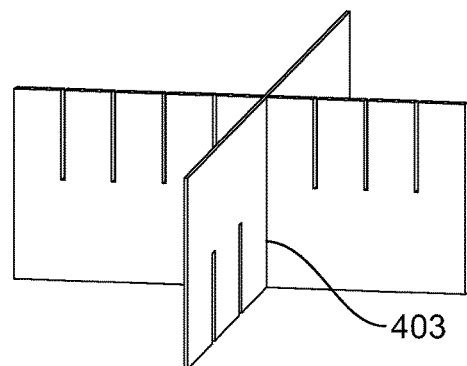
FIG. 4*b* illustrates another embodiment of a collimator assembly used to reject scattered radiation from the detector array.
Figure 4C:
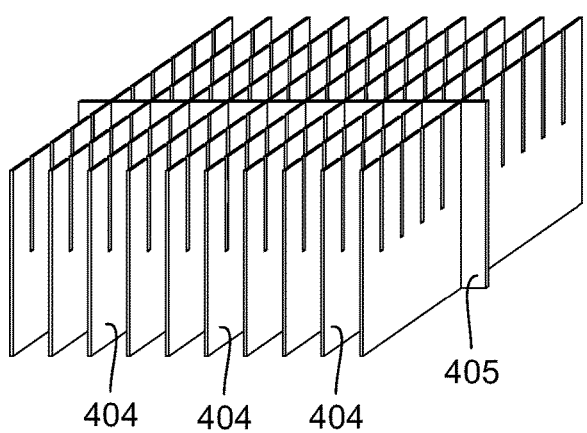
FIG. 4*c* illustrates another embodiment of a collimator assembly used to reject scattered radiation from the detector array.
Figure 4D:
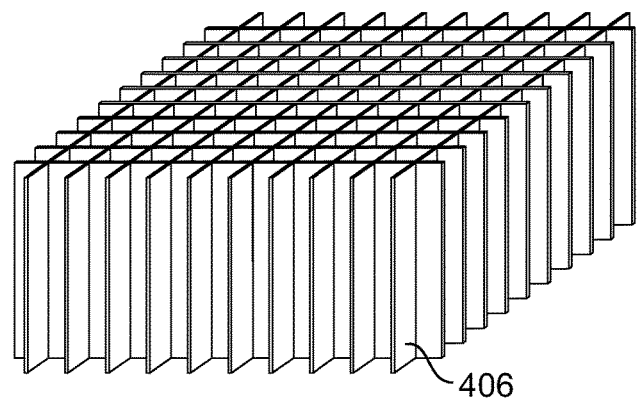
FIG. 4*d* illustrates another embodiment of a collimator assembly used to reject scattered radiation from the detector array.

FIGS. 4b, 4c, and 4d show assembly steps for manufacturing an exemplary collimator for use in the present invention. FIG. 4b shows how the two sheets shown in FIG. 4a interlock to form a cross-like structure 403. FIG. 4c shows how multiple cross-sheets 404 have been interlocked using a single sheet 405. FIG. 4d shows a full two-dimensional interlocked array of collimator sheets 406 employed to cover the entire detector module. When fully constructed, then, the array of collimator sheets 406 comprise a plurality of rows and columns formed from individual collimators 405, 404, wherein the plurality of rows and columns create a plurality of hollow space, or cells.

In one optional embodiment, spacers are provided at the base and top of each column in the array of collimator sheets 406, to ensure that the collimator aperture remains open, should the material itself become warped following machining of the interlocking slots, thus lending structural strength to the array of collimator sheets. These spacers are, in one embodiment, advantageously fabricated from a low attenuation material such as plastic or aluminium to minimise their impact in the X-ray image.

The performance of the collimator is affected by the ratio of length to width of the individual collimator openings. The higher the ratio of length to width, the better the scatter rejection of the collimator; however, such an embodiment is more expensive to manufacture. A length to width ratio ranging from 5 to 50 is ideal, and even more specifically, a length to width ratio of about 20 is likely to be found to have the best engineering optimization.

Figure 5:
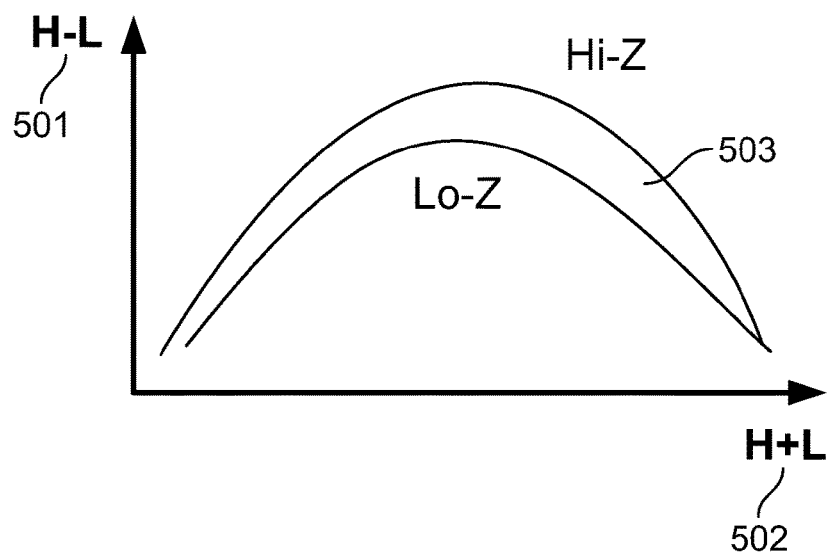
FIG. 5 is a graph showing material discrimination between high atomic number (High-Z) and low atomic number (Low-Z) materials.

In order to provide the most diagnostic information, the security scanner of the present invention is provided with materials discrimination capability. Here, coloring is applied to each individual pixel in the image. The color is dependent on the average atomic number along the path that the X-rays have followed from source to detector. This means making a measurement of each volume integral through the object at two different energies, and comparing the transmission of the X-ray beam at both high and low effective energies. The result is a plot substantially as shown in FIG. 5. H refers to the high energy signal and L refers to the low energy signal. The difference (H-L) 501 is plotted on the vertical axis and the sum (H+L) 502, or the average value of H, L is plotted on the horizontal axis. The resulting graph 503 shows High-Z and Low-Z materials distinctly. In one embodiment, the graph 503 is turned into a look-up-table for colouring individual pixels to distinguish materials in the image. Further smoothing may be applied to the image to reduce the impact of photon noise as required.

Figure 5A:
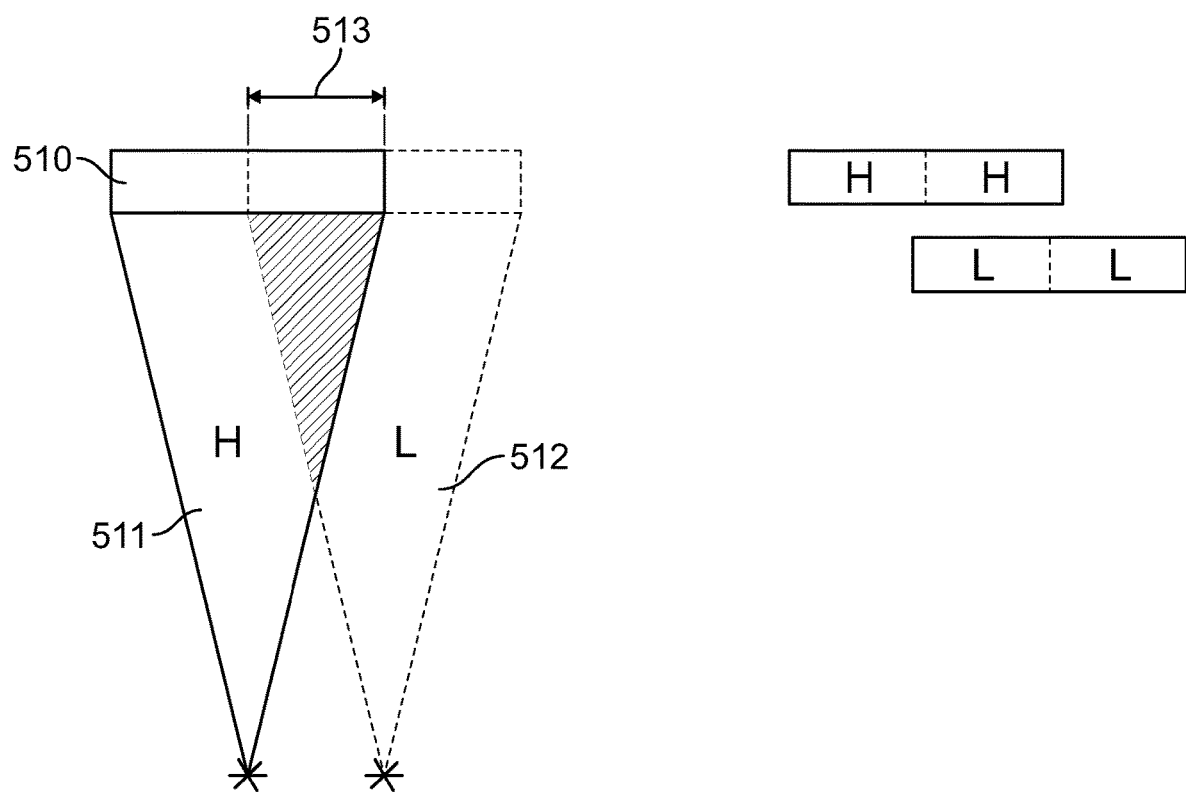
FIG. 5*a* illustrates dual energy imaging, according to one embodiment of the system described in the present specification.

In a further aspect of the present specification, the cone-beam detector array shown in FIGS. 1 and 2 is arranged such that each pixel in the detector array is irradiated twice, once with a high energy beam and once with a low energy beam for every point in the cargo. FIG. 5a illustrates how the current invention provides dual energy imaging capability. Referring to FIG. 5a, the full detector array 510 is first illuminated by a high energy X-ray beam 511. Once the cargo has travelled a distance equal to half the width of the detector array, the entire detector array is again illuminated by a low energy X-ray beam 512. Therefore, there is a region of overlap 513 between the two pulses at different energy, which forms the basis of the signal for materials characterisation. Data from the array needs to be re-arranged following each X-ray pulse so that half the data from the array from the given pulse goes to form the materials separation image with data from the other half of the array in the subsequent pulse. The other half of the data from the given pulse is used to match data from the previous pulse. It should be appreciated that a controller, programmed with the detector width and receiving a signal from a speed sensor regarding the passing speed of cargo, is used to control the timing, and selection, of a high energy pulse and a low energy pulse.

In a further aspect of this invention, it is necessary to provide a time accurate control system to ensure that each X-ray pulse occurs at exactly the right time, this time being dependent on the current speed of the cargo and on whether or not the cargo is present in the X-ray beam region. As an example, consider a train moving at 100 km/h. This equates to a distance of 93 mm per pulse at a pulse rate of 300 Hz. The control system should therefore be capable of ensuring pulse stability of better than half of the spatial resolution of the system, or around 2% of this distance (=(1/300) *0.02=0.067 ms) with beam on-off switching times calculated to better than half the jitter time between X-ray pulses (i.e. 1.5 ms at 300 Hz pulse rate).

Figure 6:
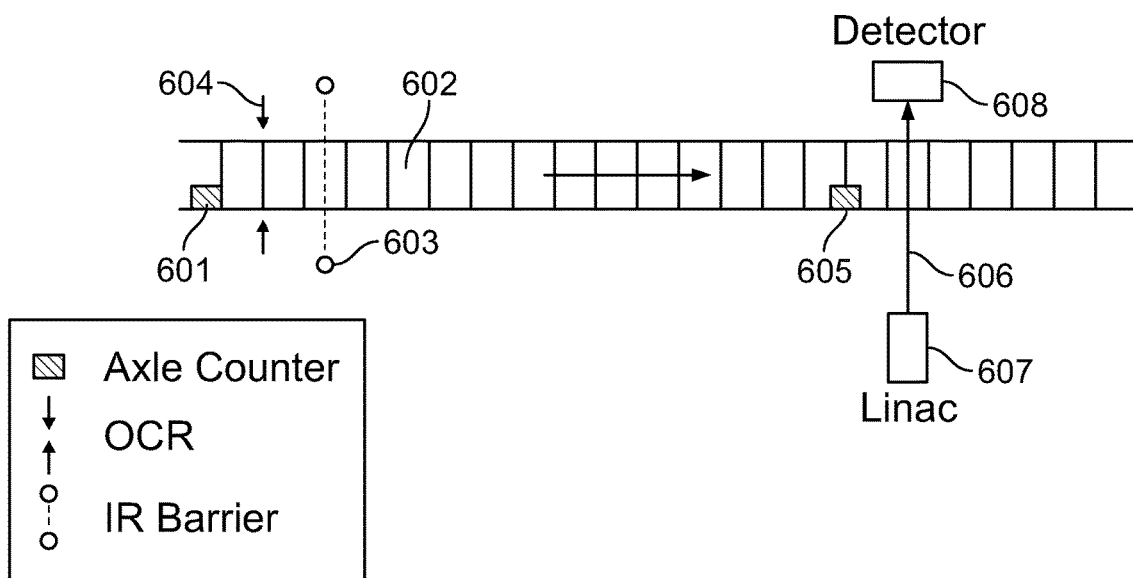
FIG. 6 provides a representative layout of a train scanner system according to one embodiment of the system described in the present specification.

FIG. 6 provides a representative layout of a train scanner system for operation at these high scanning speeds. An arriving train triggers an axle counter 601 which is installed on rail track 602. The axle counter is a reliable device which can provide time as well as speed and direction information. One or more infra-red barriers 603 are placed above the track. When the cargo intercepts these light beams, a precise time is derived for the start of cargo relative to the last time at which an axle crossed the axle counter. The light beam state change triggers an optical recognition system 604 to capture images from one or more sides of the cargo. The optical recognition 604 system also records container numbers from the passing cargo.

As the train passes along the rails to the scanning zone 606, the axles will start to trigger the second axle counter 605 adjacent to the scanning zone. The control system then calculates the time at which the leading and trailing edges of the cargo will pass though the X-ray beam, typically to sub-millisecond accuracy, referred to the most recent axle crossing. The control system then activates an X-ray enable signal to force turn on and off of the X-ray beam from the source 607 at the appropriate times, which is suitable detected by the detector array 608 on the opposite side of the track 602.

Figure 7:
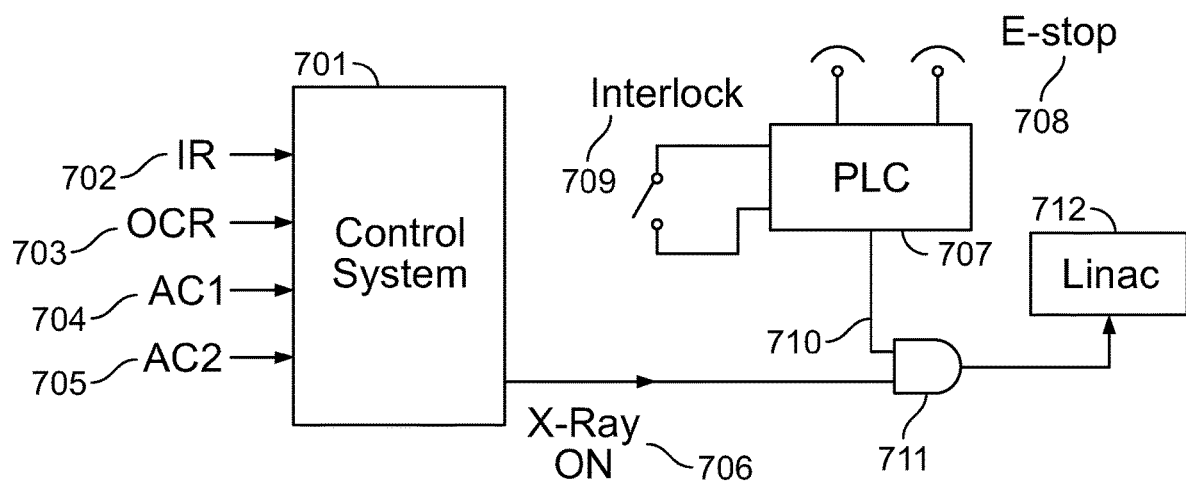
FIG. 7 illustrates a block diagram of a control system, according to one embodiment of the system described in the present specification.

FIG. 7 illustrates a block diagram of a control system, according to one embodiment of the present invention. The control system advantageously comprises a microprocessor 701 with electronics support to record the event times from the various system sensors, including IR sensors 702, optical recognition system 703 and axle counters 1 and 2, 704 and 705, respectively. The microprocessor 701 uses these inputs to calculate the X-ray on and off times 706. In parallel, a standard safety system built around a process logic controller (PLC) 707 monitors the health of E-Stop circuits 708, associated X-ray interlock circuits 709 and operator driven system enable signals to provide one or more signals 710. The signal 710 from the PLC 707 is gated by an AND gate 711 to provide the X-ray on-off gate to the X-ray source 712. The circuit of FIG. 7 provides low latency, low jitter timing for the X-ray on/off signals to meet the demands of high speed inspection.

Figure 8:
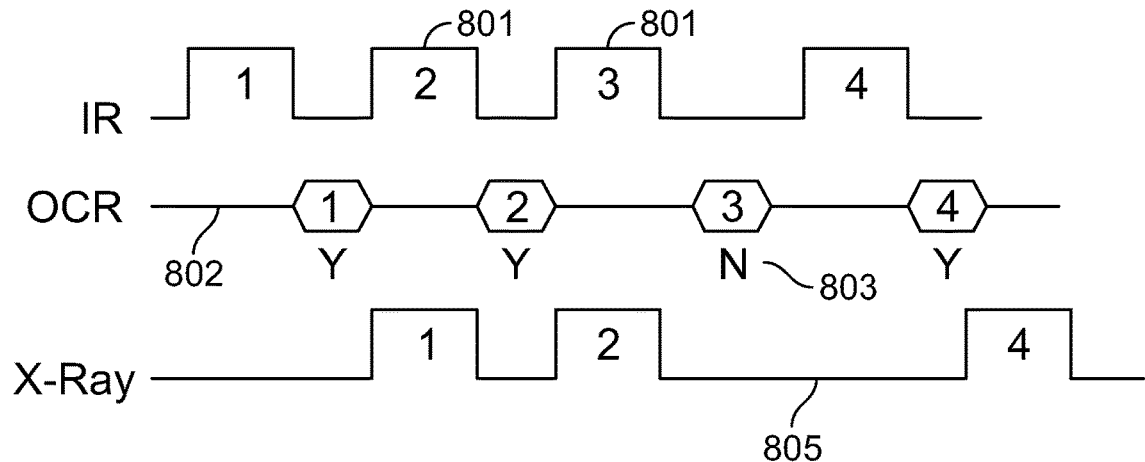
FIG. 8 is a diagram illustrating an exemplary scanning process.

In a further aspect of the present specification, the results from the optical recognition system are used to determine whether or not an X-ray image should be acquired for each component of the train. Here, the IR sensors are used to determine the start and end time for each object on the train including locomotives, carriages and other non-containerised cargo. The IR sensors trigger acquisition of optical images of the cargo which are analysed by automatic container code recognition software. If no valid container code is recognised, no X-ray of that cargo shall be conducted. If, however, a valid container code is recognised, then the cargo shall be scanned. This process is summarised with the help of an example in FIG. 8. Here four potential cargos 801 are recognised by the IR beams. Each possible cargo is identified with a sequential number as it passes through the entrance line to the scanner. At some point later, the optical recognition system returns with an inspection result 802, correlated with the IR cargo number. Thus, for each cargo container, the optical recognition may return a simple Yes or No, or may also include a confidence level on the inspection result. In one embodiment, the confidence level represents a code which has been recognized with a valid checksum. Thus, for example, a confidence of 90% or more implies that the required code has been correctly recognized along with a valid checksum. Less than this level of confidence would imply that a valid code pattern has been recognized but with an incorrect checksum, that is one or more characters have been read incorrectly.

Where a positive optical recognition inspection result is received for a given cargo, and that inspection result is accompanied a satisfactory confidence level, then that cargo will then be X-rayed. FIG. 8 shows an example where three out of a possible four cargos are inspected since one optical recognition result 803 returned a 'No'. There is no X-ray scan for the 'No' cargo 803, as visible from the scan line 805. To maximize optical recognition reliability, it is recognised that more than one optical recognition system may be used to analyze container numbers from a single container. Thus, in one embodiment, the system employs two optical recognition systems viewing either side of the container, with a third one monitoring the number on the roof of the cargo. More the number of optical recognition systems used, more reliable the system becomes. One of ordinary skill in the art would appreciate that additional safety protocols can further be introduced. In one embodiment for example, all optical recognition systems are required to return a valid result. This reduces operational scanning yield, but will also correspondingly reduce the probability of falsely irradiating non-containerised cargo.

It shall be recognized by one skilled in the art that alternative control systems can be designed using different sensor technologies, such as scanning laser sensors, inductive sensors, 3D visible light cameras and so on, as well as alternate configurations of the sensors already identified. It should also be appreciated that control systems can be designed for single track single direction scanning, single track bi-directional scanning and even multi-track, bi-directional scanning. Rather than using fully automated control systems, semi-automatic control systems may also be used in which an operator loads a train configuration prior to the scan. In some circumstances, a manual control system may be advantageous whereby an operator selects whether a cargo should be scanned as it passes through the system. The final choice of control system is always dependent on local requirements. In every case, the key inventions described herein remain valid.

Figure 9:
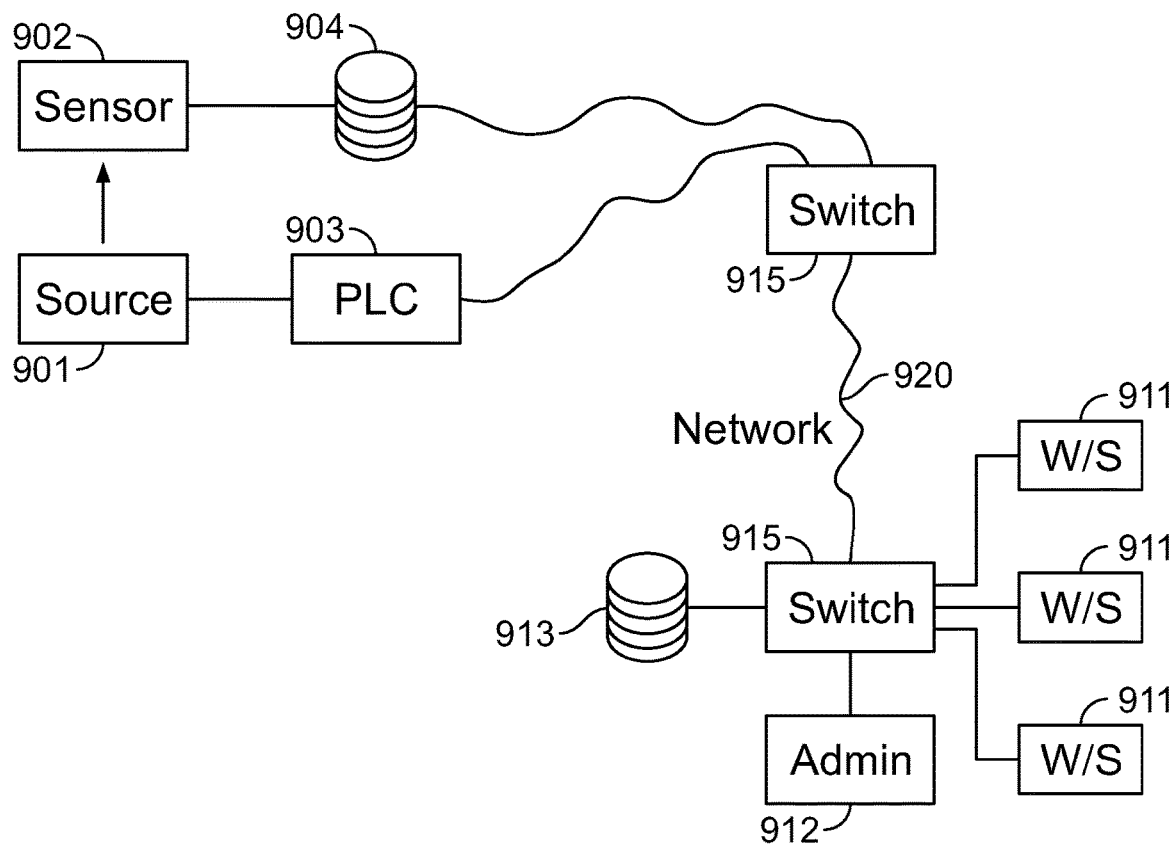
FIG. 9 is a diagram illustrating an exemplary remote networked installation of the system described in the present specification.

In a further aspect of this invention, it is recognized that it may be advantageous for such an automated system to work in a situation which is remote from the system operators. FIG. 9 shows an example of a networked installation where the source 901, sensor 902, PLC 903, control system 904 and data acquisition system are sited at the scanning location while the operator workstations 911, the system administrator 912 and main database 913 are located at a more convenient, but remote, site. They are joined by a network 920 using switches 915. The network 920, in one embodiment, is advantageously an optical fibre based system in order to deal with relatively high data rates and the long distances which may well be involved.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An X-ray inspection system adapted to scan cargo carried by a moving train, the system comprising:
   an X-ray source configured to generate X-ray beam signals directed toward the cargo;
   at least one detector array configured to receive the X-ray beam signals transmitted through the moving train, wherein the X-ray source and the at least one detector array are placed on opposite sides of the moving train to form an inspection zone;
   an image processing system configured to receive data from the at least one detector array and generate one or more X-ray images of the cargo;
   at least one axle counter configured to generate axle counter data indicative of a speed or position of the moving train; and
   a control system configured to receive the axle counter data and, based on the axle counter data, activate the X-ray source and/or modulate the X-ray source, such that the controller modulates at least one of pulse rate and energy level of the X-ray source based upon a function of at least one of a speed or position of the moving train.

2. The system of claim 1, wherein the X-ray source is a single energy source.

3. The system of claim 1, wherein the control system is configured to modulate the pulse rate such that a distance travelled by the moving train between X-ray pulses is equal to the width of the detector.

4. The system of claim 1, wherein the X-ray source is a dual energy source.

5. The system of claim 4, wherein the control system is configured to modulate the pulse rate such that a distance travelled by the moving train between X-ray pulses is equal to half the width of the detector.

6. The system of claim 5, wherein the control system causes the X-ray source to switch between a high-energy X-ray beam emission and a low-energy X-ray beam emission alternately to generate data indicative of characteristics of material within the moving train.

7. The system of claim 1, further comprising a system for acquiring optical images of the moving train.

8. The system of claim 7, wherein the control system is configured to receive optical data from the system for acquiring optical images and, based on the optical data, determines if the moving train should be scanned with the X-ray beam signals.

9. The system of claim 7, comprising at least one infrared sensor (IR), wherein the at least one IR sensor is configured to trigger the acquisition of the optical images of the moving train.

10. The control system of claim 1, further comprising a sensor system to determine a speed of the moving cargo.

11. The system of claim 1, wherein the control system is located remote to the scanning system.

12. The system of claim 1, wherein the control system is configured to receive radio frequency identification (RFID) and, based on the RFID, determines if the moving cargo should be scanned with said X-ray beam signals.

13. The system of claim 1, further comprising at least one laser sensor, wherein the control system is configured to receive laser data from the at least one laser sensor and, based on the laser data, determine if the moving cargo should be scanned with the X-ray beam signals.

14. The system of claim 1, further comprising a process logic controller (PLC) that is configured to generate a PLC output signal.

15. The system of claim 14, wherein the PLC is configured to receive signals from at least one of emergency stop circuits, X-ray interlock circuits, and operator driven systems.

* * * * *